(No Model.)
J. HARTMAN, Jr.
ELECTRIC RAILWAY.
No. 371,936. Patented Oct. 25, 1887.
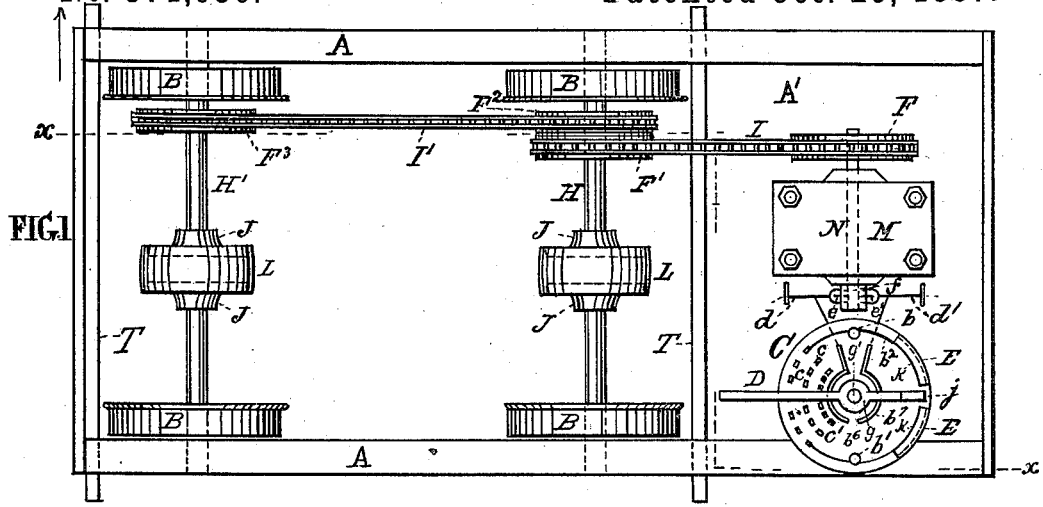
FIG.1
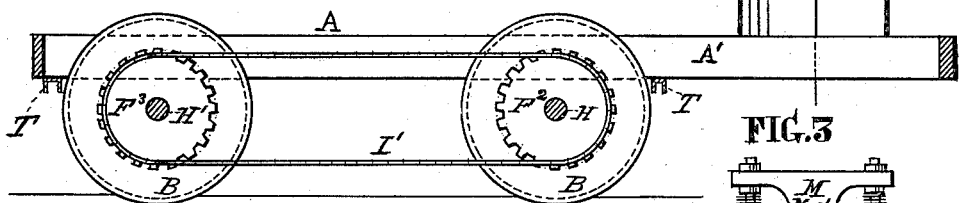
FIG.2
FIG.3
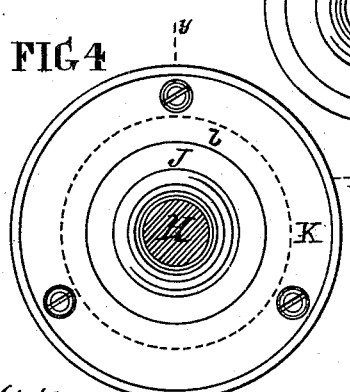
FIG.6
FIG.4
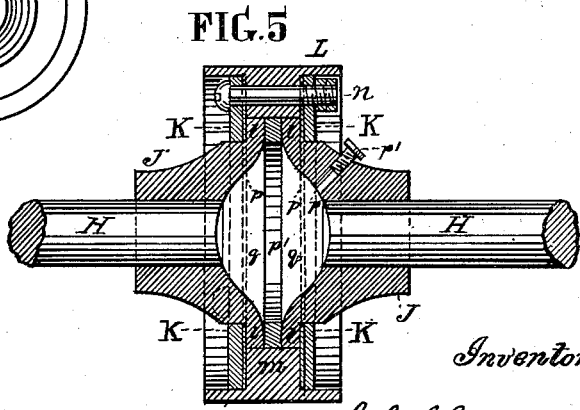
FIG.5
Witnesses.
S. E. W. Bewley.
Jos. M. Macferran
Inventor.
John Hartman, Jr.
per Thomas J. Bewley, Atty.

UNITED STATES PATENT OFFICE.

JOHN HARTMAN, JR., OF PHILADELPHIA, PENNSYLVANIA.

ELECTRIC RAILWAY.

SPECIFICATION forming part of Letters Patent No. 371,936, dated October 25, 1887.

Application filed November 12, 1885. Serial No. 182,642. (No model.)

*To all whom it may concern:*

Be it known that I, JOHN HARTMAN, Jr., a citizen of the United States, residing at Philadelphia, in the county of Philadelphia and State of Pennsylvania, have invented certain new and useful Improvements in Cars for Electric Railways, of which the following is a specification.

In the first place, the invention consists in connecting the axles together by means of an endless chain which passes around sprocket-wheels fixed upon the axles, by means of which connection greater traction is obtained for the wheels upon the rails, giving greater frictional contact on the rails, rotary motion being imparted to the wheels by means of an endless chain passing over a wheel upon the outer end of the shaft of the motor, which revolves around the periphery of a wheel upon the front axle in line therewith.

The invention further relates to the means employed for equalizing the strain and friction of the wheels upon the rails; and it consists in providing the inner end of each piece of the axle with a hub having a flange upon its periphery, the two hubs being held in connection with an annular flange of the rim by means of a collar upon each, through which confining-bolts pass and rigidly confine the collars and rim together in such a manner that the axles and their connected hubs are permitted independent rotary motion within the circular orifices of their connecting-collars. The inner surfaces of the hubs are coved or recessed to form an oil-reservoir for lubricating purposes, the oil being inserted through a hole drilled in one of the hubs and closed by means of a screw-plug.

In the accompanying drawings, which make a part of this specification, Figure 1 is a plan view. Fig. 2 is a sectional view taken through the broken line $x\ x$ in the direction of the arrow. Fig. 3 is a side elevation of the motor. Fig. 4 is a side elevation of the hub J, collar K, and rim L. Fig. 5 is a transverse section of the same, taken through the broken line $y\ y$ of Fig. 4. Fig. 6 is a face view of a hub.

Like letters of reference in all the figures indicate the same parts.

A is the truck-frame, and A' an extension thereof for the reception of the operating mechanism. B are the car-wheels, C the rheostat, and M the motor.

Upon the end of the shaft N of the motor is situated the sprocket-wheel F, over which the endless chain I passes and connects the same with the wheel F' on the axle H, whereby propelling motion is imparted to the car. The axles H H' are each provided with sprocket-wheels $F^2\ F^3$, over and around which the endless chain I passes, causing a greater amount of propelling power to be more equally applied to both axles and with less tendency for the wheels to slip upon the rails than when motion is imparted to but one axle.

The axles H H' are each divided transversely, and are provided with hubs J at their inner ends, rigidly secured thereon, which have circular flanges $l$, forming their periphery. Collars K, which have central circular openings, rest against the outer faces of the flanges $l$, and are secured to the annular flange $m$ of the rim L by means of the bolts $n$. Wearing-collars $p$ of hard metal may be placed between the contiguous surfaces of the flanges $l$ of the hubs and the collars K, and a like collar, $p'$, between the inner surfaces of the hubs. The inner faces of the hubs are recessed to form an oil-chamber or reservoir, $q$, for lubricating the parts, the oil being supplied through the hole $r$ in one hub, and a screw-plug, $r'$, inserted to prevent the escape of oil during the revolutions of the axle. Each end of the axle and its hub being in a connected piece, the opening in the collar allows of rotary motion. At the same time all the parts are securely bound together.

The truck-frame A and its extension A' are formed together parallel longitudinally with the center of the journal of the axles.

The peculiar construction of rheostat herein shown and referred to is made the subject of an application for Letters Patent filed January 21, 1887, Serial No. 225,049, which is a division of the present application. This rheostat is shown at C in Fig. 1. The current is led from the supply-mains by a suitable carrier to the points $b\ b'$, Fig. 1. $b$ is connected with an undercut metallic piece, E, and also with one of a series of contact-posts, $c$, connected by resistances, with which posts bar D is adapted to contact as it swings about its pivot at $g'$.

This bar D has on its under surface and insulated from it two distinct pieces of metal, R R', long enough, respectively, to bridge any of the contact-posts $c$ and semicircular contact-bar $b^6$, on the one hand, and to bridge one of the undercut pieces E E' and another semicircular contact-bar, $b^7$, on the other hand. These bars $b^6$ $b^7$ are connected with the motor terminals. Suppose, now, the bar D is shifted so that its extremity $j$ makes contact with undercut piece E and its bridge-piece on the under left-hand side bears on the desired resistance-post. The current then proceeds from $b'$ to E, through bridge $j$ to bar $b^7$, through the motor to bar $b^6$, through bridge-piece R on the under side of E to the resistance-post on which it rests, through the intermediate resistances to point $b$ and the source of supply.

I claim as my invention and desire to secure by Letters Patent—

1. In a car for electric railways, the two axles H H', divided transversely and united by a yielding coupling, as shown, in combination with suitable mechanism for imparting rotary motion to both said divided axles, as drivers, and their connected wheels, said operating mechanism for imparting rotary motion being connected thereto at but one side of said axles, substantially in the manner herein shown and described.

2. In a car for electric railways, the axles H H', divided transversely and united by a yielding coupling, as shown, and suitable mechanism for imparting rotary motion to said axles and wheels upon one side of the car, in combination with an electric motor provided with a rheostat for controlling speed, substantially in the manner herein shown and described.

JNO. HARTMAN, JR.

Witnesses:
THOMAS J. BEWLEY,
EBENEZER COBB.